United States Patent [19]
Cordelle et al.

[11] 3,823,364
[45] July 9, 1974

[54] METHOD AND DEVICE FOR PROVIDING COMPENSATION FOR GYROMAGNETIC EFFECT IN YAWING MOTION OF CRAFT-CARRIED TOTAL-FIELD MAGNETOMETERS

[75] Inventors: Michel Cordelle, Grenoble; Jean Crescini, Domeng; Henri Glenat, Biviers; Antoine Salvi, Fontaine, all of France

[73] Assignee: Commissariat A L'Energie Atomique, Paris, France

[22] Filed: Apr. 3, 1972

[21] Appl. No.: 240,540

[30] Foreign Application Priority Data
Apr. 9, 1971  France .............................. 71.12816

[52] U.S. Cl. ............................ 324/0.5 R, 324/0.5 E
[51] Int. Cl. ............................................. G01r 33/08
[58] Field of Search ............... 324/43 R, .5 R, .5 E; 16/11

[56] References Cited
UNITED STATES PATENTS
2,899,637  8/1959  Stein .............................. 324/43 R
3,396,329  8/1968  Salvi ............................... 324/.5 R FOREIGN PATENTS OR APPLICATIONS
850,692  10/1960  Great Britain .................. 324/43 R

*Primary Examiner*—Robert J. Corcoran
*Attorney, Agent, or Firm*—William D. Stokes

[57] ABSTRACT

The method and the device provide compensation for the gyromagnetic effect which is sustained by a total-field magnetometer having a sensing winding and which arises from angular movements performed about a given direction by a craft which carries the magnetometer. An electric signal is produced and the intensity of said signal is proportional to the angular velocity of the craft about said direction. A correction which is proportional to the signal and takes into account the angle made by said direction with the lines of force of the field to be measured is made in the indications supplied by the magnetometer.

7 Claims, 8 Drawing Figures

AMPLIFICATION STAGE

METHOD AND DEVICE FOR PROVIDING COMPENSATION FOR GYROMAGNETIC EFFECT IN YAWING MOTION OF CRAFT-CARRIED TOTAL-FIELD MAGNETOMETERS

This invention is concerned with a method and a device for compensating the gyromagnetic effect which constitutes one of the causes of interference with magnetic field measurements carried out by means of high-sensitivity magnetometers which are mounted on a moving carrier craft. The gyromagnetic effect is a particularly influential factor in the case of nuclear magnetic resonance magnetometers designed for measuring the absolute value of the terrestrial magnetic field (prospecting magnetometer) or the variations in this field (detection magnetometer). In fact, the resonant frequency of the nuclei which are usually employed (of the order of 2 kc/s in the case of protons in a field of 0.5 Oersted, namely 50,000 gamma) is low and the rotational movements of the measuring probe about the lines of force of the terrestrial magnetic field result in differences between the resonant frequency and the frequency detected by the winding or windings which collect the signal induced by the precession of the nuclei. In point of fact, these differences represent an appreciable fraction of the total field. In the case of magnetometers in which the measuring probe has a single winding or a number of windings which are all placed along the same axis, the apparent frequency variation introduced by the gyromagnetic effect is proportional to the angular velocity of the common axis of the windings about the lines of force. This variation accordingly represents an absolute error of about 1 gamma for an angular velocity of 12°/sec. in the case of protrons.

The Applicant company has described and claimed in French patent No. 1430874 applied-for on Dec. 12, 1963 a nuclear magnetic resonance magnetometer in which the gyromagnetic effect is suppressed. The achievement of this result, recourse is had to the simultaneous use of two nuclei which have different gyromagnetic ratios and therefore different resonant frequencies in the same field. By composition of the signals induced by both types of precessing nuclei within two parallel coils or within a single coil, there is thus obtained a signal at the beat frequency which is not affected by the gyromagnetic effect. Although it is possible in this manner to eliminate the gyromagnetic effect, this expedient has the disadvantage of complicating the installation and making it necessary to carry out a measurement at a very low beat frequency, thus increasing the response time of the magnetometer and reducing the degree of accuracy achieved.

The aim of the invention is to provide a method and a device of much more simple conception, in which the primary objective consists in compensating for the action of the gyromagnetic effect rather than endeavoring to eliminate this effect.

To this end, the invention proposes in particular a method of compensating for the gyromagnetic effect sustained by a total-field magnetometer comprising a sensing winding, and arising from the angular movements performed about one direction by the craft which carries the magnetometer; in accordance with this method, there is produced a signal whose intensity is proportional to the angular velocity of said craft about said direction and there is made in the indications supplied by the magnetometer a correction which is proportional to said signal and takes into account the angle between said direction and the lines of force of the field to be measured.

In one embodiment of the invention, in order to make said correction, there is applied to said winding a corrective magnetic field which is substantially proportional to said intensity and oriented in said direction.

The invention further proposes a device which provides compensation for the gyromagnetic effect sustained by a total-field magnetometer comprising a sensing winding, and arising from the angular movements performed about one direction by the craft which carries the magnetometer, wherein said device comprises means for producing an electric signal which is proportional to the angular velocity of said craft about said direction and means for making in the indications supplied by the magnetometer a correction which is proportional to said signal and takes into account the angle between said direction and the lines of force of the field to be measured.

According to a further aspect of the invention, the correction means comprises a coil which is supplied with an electric current substantially proportional to said intensity and subjects said winding to a magnetic field which is oriented in said direction and substantially proportional to said angular velocity.

The invention can be adapted to compensate for the action of the gyromagnetic effect on absolute measurements of field as well as on measurements of variations. The invention is particularly well suited to the case of a detection magnetometer which is mounted on board an aircraft: in this case, the magnetometer is advantageously placed in such a manner as to ensure that the axis of the sensing element (namely the axis of the winding) coincides with the rolling axis of the aircraft, about which the most violent movements take place. This arrangement is always possible when making use of a magnetometer probe unit or so-called sensor in which the axis of symmetry of revolution does not constitute a forbidden axis (that is to say an axis along which a magnetic field cannot be measured), namely of the type described and claimed in the U.S. Pat. No. 3,735,246, issued May 22, 1973 and assigned to the assignee of the instant application, the pitching movements to which an aircraft is subjected during flight and when carrying a magnetometer of this type always remain of relatively small amplitude since the aircraft flies at low altitude. In consequence, it is only necessary to compensate for the gyromagnetic effect along the yawing axis which, in practice, is always close to the vertical axis. In point of fact, a heading-control system is fitted on the majority of aircraft at the present time and delivers at each instant electric signals which are intended to be composed within three coils which thus tend to align a rotor in the direction of the heading, or course followed by the aircraft. From the signals produced by said control system, it is possible to reproduce in a relatively simple manner the electric signal which is proportional to the angular velocities about the vertical axis which is necessary in order to carry out the method hereinabove defined and to compensate for the yawing gyromagnetic effect.

A clearer understanding of the invention will be obtained from a perusal of the following description in which a device for compensating the gyromagnetic effect of a nuclear magnetic resonance magnetometer is given by way of non-limitative example, reference being made to the accompanying drawings, wherein.

Figure 1:
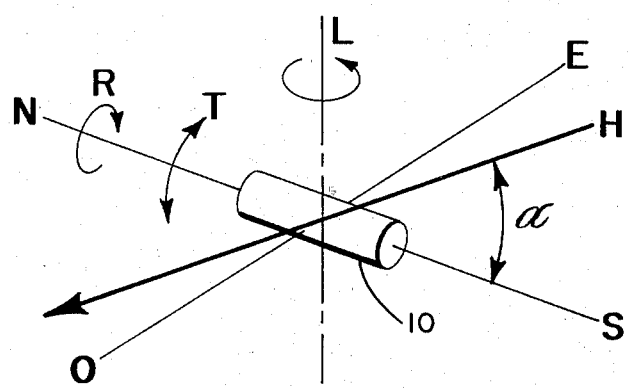
FIGS. 1 and 2 are explanatory diagrams illustrating the gyromagnetic effect which takes place during the movements of an aircraft which is flying on a magnetic-north course (FIG. 1) and on westerly course (FIG. 2)

Before describing the device according to the invention and the method which it carries into effect, it is useful to recall that the gyromagnetic effect is proportional to the angular velocity of rotation of the axis of the sensing windings of the magnetometer about the lines of force of the magnetic field to be measured; the error signal is therefore proportional on the one hand to the modulus of the angular velocity of rotation of the axis of the windings and on the other hand to the sine of the angle between the lines of force and the axis of the windings. This must be taken into account by the compensation system, either at the stage of measurement of the error signal, or at the stage of application of the compensation field.

In a first device according to the invention, a sensor is used for measuring the velocity of rotation about the lines of force (said sensor being constrained to follow the direction of said lines of force) and the compensation is carried out either by superimposing on the output signal a corrective signal which is proportional to the signal derived from said sensor or by applying to the magnetometer a compensating magnetic field by means of a winding which is maintained parallel to the lines of force and supplied with a current which is proportional to the signal derived from the measuring sensor.

In a second device according to the invention, three sensors are employed for measuring the velocity of rotation about three axes which are fixed with respect to the earth and compensation is carried out either by superimposing on the output signal a corrective signal which combines the signals derived from said sensors or by applying three compensating magnetic fields to the magnetometer by means of three windings maintained parallel to said three axes which are fixed with respect to the earth.

These two devices ensure strict compensation for the gyromagnetic effect. However, such devices are complex and expensive, as is the case with all their components as required either for the measurement of the error signal or for the application of the compensation signal. There now follows a description of a simplified device which makes it possible at much lower cost to provide approximate but wholly sufficient compensation for the gyromagnetic effect on board and aircraft.

Before proceeding with the description of said compensation device and the method employed, it may be of interest to recall a few fundamental data relating to the gyromagnetic effect to which a nuclear magnetic resonance magnetometer is subjected, the measuring sensor of said magnetometer being placed in such a manner as to ensure that the axis of said sensing coil is parallel to the rolling axis of the aircraft. It will be assumed in the following description that the magnetometer comprises a measuring head or sensor 10 of the type described in the above-cited U.S. Pat. No. 3,735,246, issued May 22, 1973 and assigned to the assignee of the instant application, without any forbidden measuring axis. Said sensor 10 is placed in a tail-plane extension 12 of plastic material which is free from any magnetic inclusion, this extension being frequency referred-to as a radome. The windings (not shown) in which the precessing nuclei induce an electromotive force are placed along the rolling axis of the aircraft.

Under these conditions, when the aircraft is flying on a magnetic-north heading or a magnetic-south heading (FIG. 1), the lines of force of the terrestrial magnetic field $\vec{H}$ have a direction contained in a vertical plane including the roll axis. It is also known that the nuclei precess in a plane at right angles to the direction of the lines of force of the magnetic field, that is to say at right angles to $\vec{H}$. In consequence, there is in this case:

no gyromagnetic effect in rolling motion (arrow R), since the axis of the coil does not move, no gyromagnetic effect in pitching motion (arrow T) since the axis of the coil rotates in a plane which contains the magnetic field, and a yawing gyromagnetic effect (arrow L) which is a linear function of $\cos \alpha$, wherein $\alpha$ is a dip of the earth's magnetic field.

Figure 2:
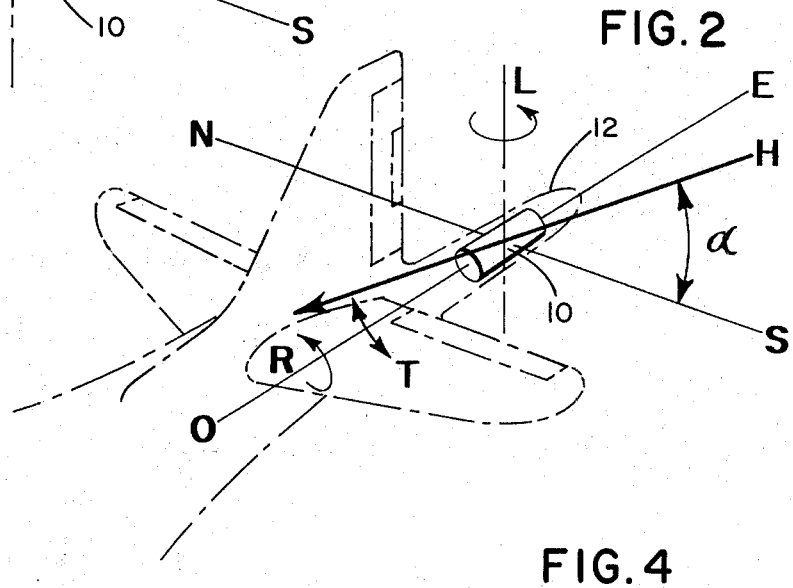

Similarly, when the aircraft is flying on an east-west course or heading (FIG. 2), the gyromagnetic effect remains zero in rolling motion (arrow R), the gyromagnetic effect in pitching motion (arrow T) is proportional to $\sin \alpha$ (since the angle of control is reduced in a ratio which is represented by a $\sin \alpha$ when it is projected on the precession plane), and the yawing gyromagnetic effect (arrow L) is also proportional to $\sin \alpha$.

The following table can consequently be drawn-up:

| Control | N - S | E - W |
| --- | --- | --- |
| Rolling | 0 | 0 |
| Pitching | 0 | $\sin \alpha$ |
| Yawing | $\cos \alpha$ | $\sin \alpha$ |

On intermediate courses, there is evidently found to exist an effect which is located between those corresponding to the four principal courses.

Since the gyromagnetic effect in the case of the different control operations is dependent on the angle $\alpha$, the intensity of the gyromagnetic effect will depend on the latitude. At any point near the equator at which $\alpha$ is practically zero, there only remains a yawing gyromagnetic effect on the north-south course. In pitching motion, the gyromagnetic effect corresponds to a control angle which is always smaller than the real angular amplitude of the pitch motion except on the east-west course near the pole. Since in any case the angular amplitude in pitching motion always remains small, the corresponding gyromagnetic effect can usually be disregarded and a correct compensation for the gyromagnetic effect in yawing motion added to the absence of gyromagnetic effect in rolling motion is sufficient from a practical standpoint.

Figure 3:
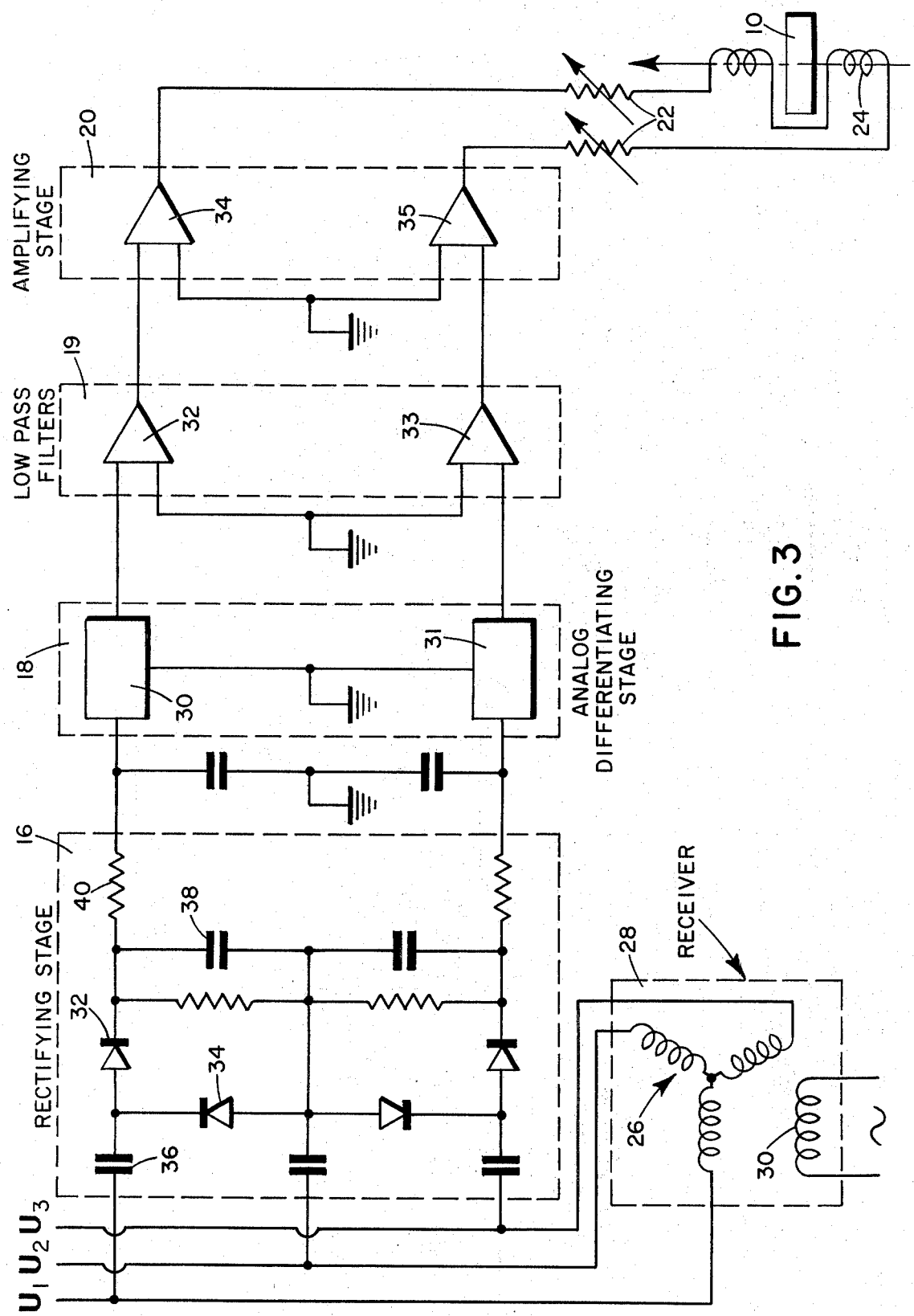
FIG. 3 is a general arrangement diagram of the compensation device.

The device which is represented in FIG. 3 by a block diagram ensures the above-mentioned compensation for gyromagnetic effect in yawing motion. The device can be considered as comprising a rectifying stage 16, an analog differentiating stage 18, a pre-amplifying stage comprising low-pass filters 19 and an amplifying stage 20. Each stage has two symmetrical channels and the two channels of the output amplifier supply through variable resistors 22 a pair of coils 24 which are aligned along an axis parallel to the yawing axis of the aircraft and which are placed on each side of the measuring sensor 10 in order to produce a compensating field $\vec{h}$.

Three alternating-current voltages $U_1$, $U_2$ and $U_3$ which are delivered by the heading-control system of the aircraft are applied to the input of the rectifier circuit 16 and are assumed to be intended to supply repeating synchro-receivers having three windings; by way of indication, it can be stated that a heading-control system of the usual type will supply voltages within the range of 0 to 34 V, at a frequency of 400 c/s.

FIG. 3 shows diagrammatically a synchro-receiver of the type usually referred-to as a "selsyn". The three conductors which are brought to alternating-current voltages having rms values of $U_1$, $U_2$ and $U_3$ are connected to the three windings of a three-phase rotor 26 of the receiver 28, the stator winding 30 of which is supplied in single-phase from the same source as the transmitter of the heading-control system. The conductors are also connected to the three coils of the three-phase winding of the synchro-transmitter rotor of the control system and, when both rotors have the same orientation, no current flows through the conductors. An angular position-setting of the two rotors in the state of equilibrium corresponds to each combination of values $U_1$, $U_2$, $U_3$. A similar arrangement is employed in other ordinary remote display systems such as those designated as "magslip", "autosyn", "magnesyn".

Starting from the rms voltage values $U_1$, $U_2$ and $U_3$ which indicate the aircraft heading, the symmetrical detectors (generally designated by the reference 16 in FIG. 3) produce two direct-current voltages $V_1$ and $V_2$ whose difference $V_1 - V_2$ is proportional to $(U_1 - U_2) - (U_3 - U_2)$ both in value and in sign. This difference is representative of the aircraft heading (in other words of the angular position of the aircraft in a horizontal plane).

The rectifier stage 16 is wholly symmetrical and only that half which delivers the voltage $V_1$ will be described. Said half-stage comprises two semiconductor diodes 32 and 34. The diode 32 is connected by means of a capacitor 36 to the conductor which is brought to the voltage $U_1$ and by means of the diode 34 to the conductor at the voltage $U_2$ which serves as a reference. The rectifier comprises an L-section filter circuit constituted by an electrolytic capacitor 38 having a value of a few tens of μF and a resistor 40 having a value of a few tens of thousands of ohms.

Figure 4:
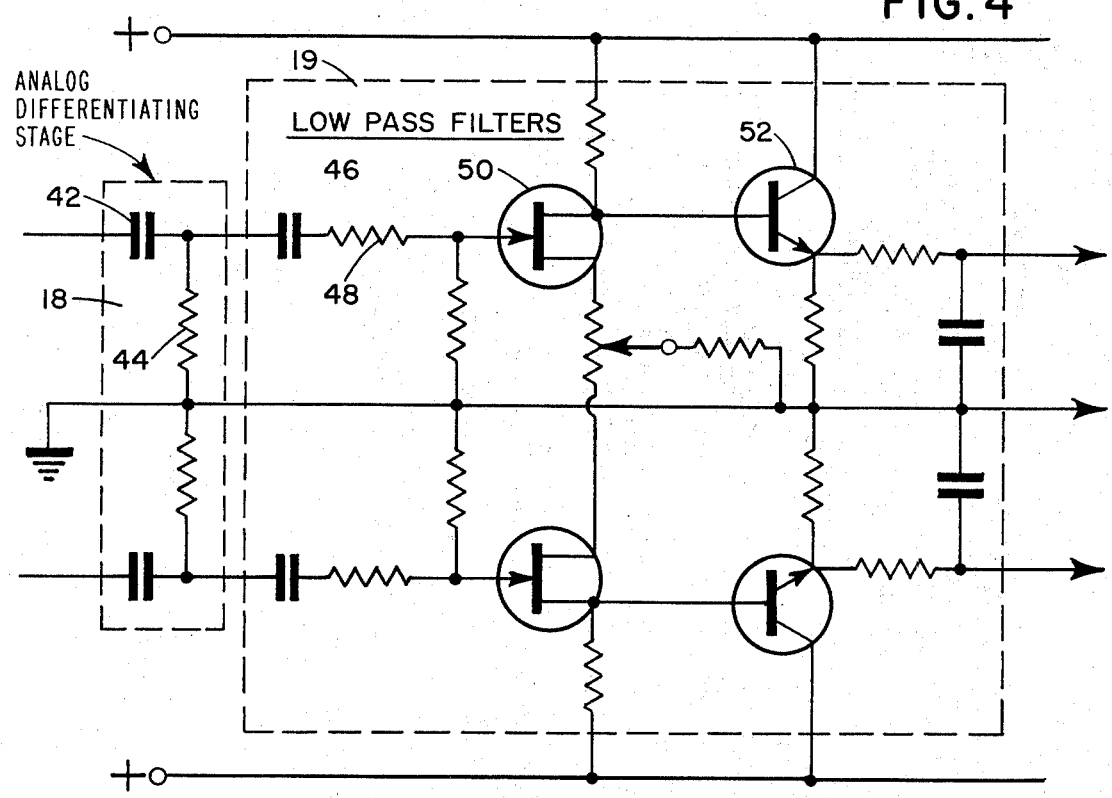
FIGS. 4 and 5 are diagrams of sub-assemblies which are intended to be employed in the device of FIG. 3.

The output voltages $V_1$ and $V_2$ supplied by the rectifier stage 16 are applied to a differentiating stage 18 constituted by two differentiating circuits 30, 31 mounted symmetrically with respect to ground (earth). Each of the differentiating circuits 30, 31 which are illustrated in FIG. 4 by way of example comprises in conventional manner a capacitor 42 which is grounded through a resistor 44. The differentiating circuits supply two output voltages which are respectively proportional to $dV_1/dt$ and $dV_2/dt$ (which are differentiated with respect to time). These two output voltages are applied to the inputs of the preamplification and filtering stage 19 (shown in FIG. 3). The preamplifiers 32, 33 amplify the voltage signals and comprise filters which prevent the transmission of components having a frequency of higher value than is liable to arise from the yawing movements of the aircraft, these components being due to the parasites induced in the connecting cables by the high electromagnetic fields of various types which exist on board an aircraft. The preamplifiers can be of the type illustrated by way of example in FIG. 4, in which the filters have not been shown. Filters of this type, which are placed at the output of the pre-amplifier, can be of conventional design and have a cut-off frequency of the order of 1 c/s. It should be noted in this connection that it is not usually necessary to provide filters designed for the elimination of frequencies which are too low since the connecting capacitors between stages are sufficient to perform this function.

Each of the preamplifiers illustrated in FIG. 4 is connected to the differentiating stage by a connecting capacitor 46 and a resistor 48 which is intended to limit the current drawn and to prevent any interference with the operation of the differentiating stage. There will be employed by way of example a resistor 48 of the order of one kilohm if the resistor 44 has a value of a few tens of kilohms. In order to provide the preamplifier with a high input impedance, its input element is constituted by a field-effect transistor 50 which drives a nomral n-p-n transistor 52. In order that the circuit arrangement should be wholly symmetrical, the two halves of a same double transistor can be employed as corresponding elements on the two channels.

Figure 5:
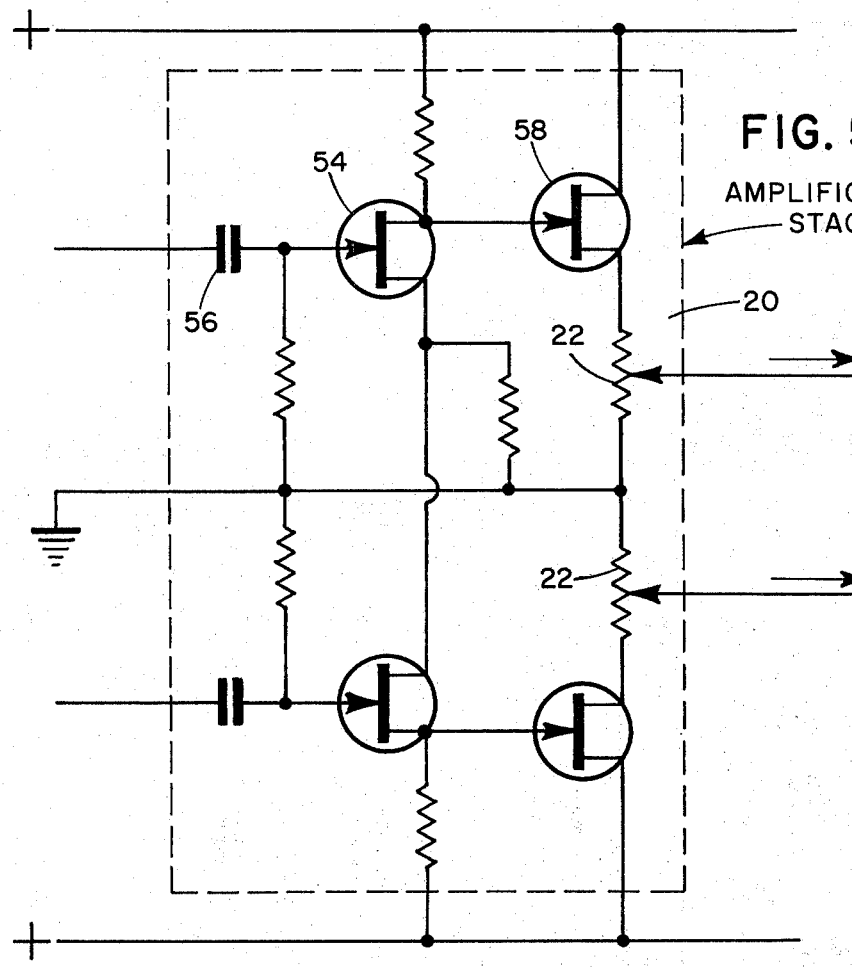

The filtered signals are applied to the two-channel amplification stage 20 having amplifiers 34, 35 which delivers the necessary current for the supply of the compensation coils 24. The stage 20 can be constituted by a single differential amplifier. However, it will usually prove advantageous to make use of a symmetrical stage of the type illustrated diagrammatically in FIG. 3 in order to gain some measure of freedom from fluctuations in the supply voltage. Each channel of the amplification stage 20 which is given by way of example in FIG. 5 comprises an input field-effect transistor, the control signals being applied to the grid of said transistor by means of a capacitor 56 and an output field-effect transistor 58. A stage of this type can readily be designed as an integrated circuit. The variable resistors 22, the maximum value of which is 5 kilohms in an apparatus which has actually been constructed, provide the load circuit with an essentially resistive impedance and therefore attenuate the self-induction effects produced by the coils 24. By reason of the low value of the corrective fields which are necessary, it will usually be considered sufficient to have a current intensity which is always lower than 300 μA.

It is apparent that the device which has just been described produces a current intensity which is proportional to the velocity of rotation of the aircraft about its vertical axis (that is to say about its yawing axis when the trim of the aircraft is substantially horizontal). This current flows through the coils 24 and produces a corrective field $\vec{h}$ which is directed along the yawing axis and combined vectorially with the terrestrial magnetic field $\vec{H}_m$ as observed and measured by the magnetometer (and therefore subject to the error which results from gyromagnetic effect). Moreover, the terrestrial magnetic field varies between 20,000 γ and 70,000 γ approximately whereas the corrections made are smaller than 1 γ. Under these conditions, inasmuch as the nuclear magnetic resonance magnetometer measures the total field applied thereto or the variations in said total field, it is apparent that the component of the field $\vec{h}$ at right angles to the field $\vec{H}_m$ will result solely in causing a slight rotation of the lines of force of the field applied to the sensor without modifying its intensity: in other words, if reference is now made to FIG. 6, it is apparent that only the component of the field $\vec{h}$ produces action in practice in the direction of the field $\vec{H}_m$.

Figure 6:
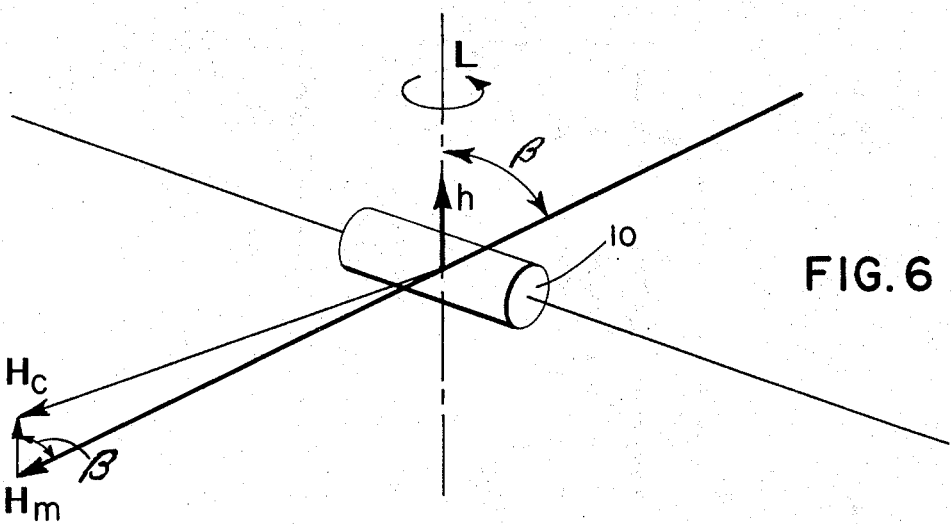
FIG. 6 shows the composition of the terrestrial magnetic field and of the compensation magnetic field.

In FIG. 6, it is apparent that action is produced solely by the component $h \cos \beta$, where $\beta$ is the angle made between the direction of the field and the vertical axis. The correction will therefore be of maximum value at the poles (wherein $\beta = 0$) and zero at the equator ($\beta = 90°$). The total field measured after correction is $\vec{H}_c = \vec{H}_m + \vec{h}$ and we have $$H_c^2 = H_m^2 + h^2 - 2Hh \cos \beta, \qquad 1.$$

from which is obtained $$H_c = H_m - h \cos \beta \qquad 2.$$

by developing in series and by neglecting the terms in $h^2$.

It will be noted that formula (2) is valid irrespective of the axis about which the effects of the rotations are combined, $\beta$ being the angle between the direction of the field and this axis of rotation; the formula is is equally valid in the device comprising three measuring sensors and three compensation windings referred-to earlier in this description and this holds true in the case of each of the three axes of coordinates which are fixed with respect to the earth.

The assumption that the yawing axis of the aircraft coincides with the vertical cannot be wholly verified. However, this lack of concordance has no practical consequence. In fact, yawing movements about an axis which is inclined to the vertical can take place practically only when the aircraft is flying in a loop or, in a very transient manner, when the aircraft begins a loop manoeuver or passes out of the loop. However, the maximum inclination does not in that case exceed 30°, with the result that the projection of the corrective field $\vec{h}$ with respect to the vertical represents a large fraction of the field $\vec{h}$. The contribution of the gyromagnetic effect in yawing motion to the "factor of merit" of a detecting magnetometer (sum of the 12 disturbances recorded during the three reference manoeuvers in rolling motion, pitching motion and yawing motion on the four main courses) has thus been reduced from 0.3 gamma to 0.02 gamma approximately.

The compensation coil can also be mounted if necessary on a support which is made to retain a vertical orientation.

The device which is illustrated diagrammatically in FIG. 1 is associated with a magnetometer which comprises a single measuring probe or sensor 10. A similar device can be employed in the case of a magnetometer which is equipped with an installation providing automatic compensation for disturbances produced by the aircraft (eddy currents circulating within the fuselage and especially within the wings and tail-planes); installations of this type are described, for example, in French patents No 1 485 557 of Feb. 4, 1966 and 1 591 129 of Oct. 17, 1968 which were filed by the Applicant company and to which reference may usefully be made. These automatic compensation installations comprise two probe units, one of these units being referred-to as a measuring sensor and delivers an electric signal proportional to the value of the field in which it is placed. The other probe unit or sensor is placed at a point at which the terrestrial magnetic field is practically identical with the field which produces action on the first sensor but at a different distance from the center of gravity of the magnetic masses of the aircraft in order that the disturbances caused by the aircraft should be different at that point; the second sensor accordingly makes it possible to determine the difference in the moduli of the total field at the two points. Starting from this difference, a corrective signal is automatically reconstituted in order that it may thus be possible to deduce the value of the terrestrial magnetic field from the field measured by the first sensor.

Figure 7A:
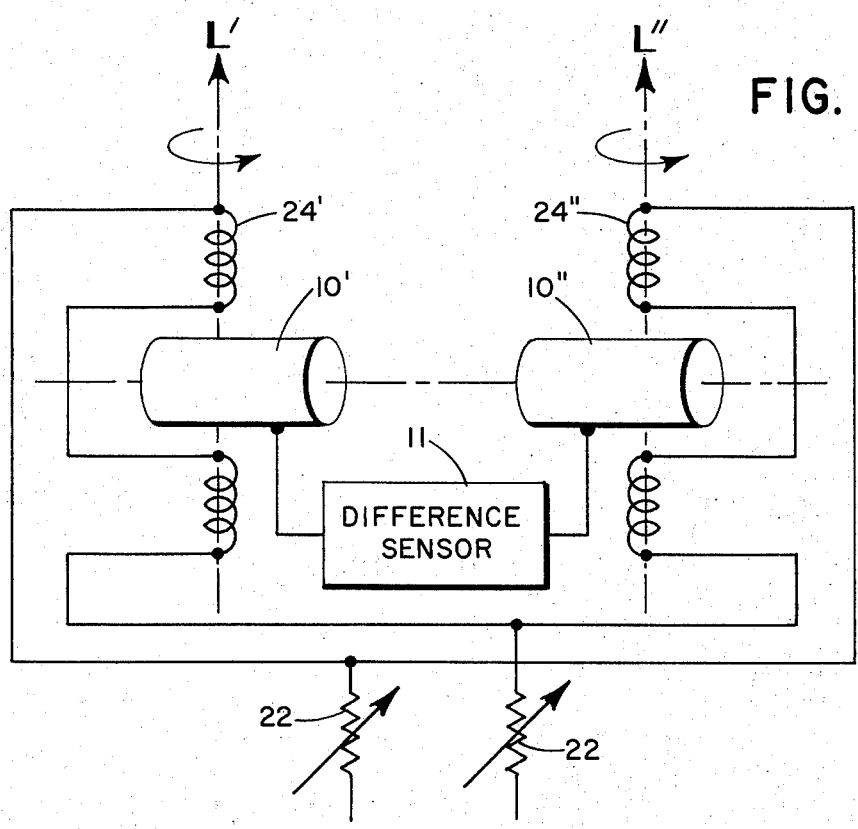
FIGS. 7a and 7b show embodiments of magnetometers having two sensor windings.
Figure 7B:
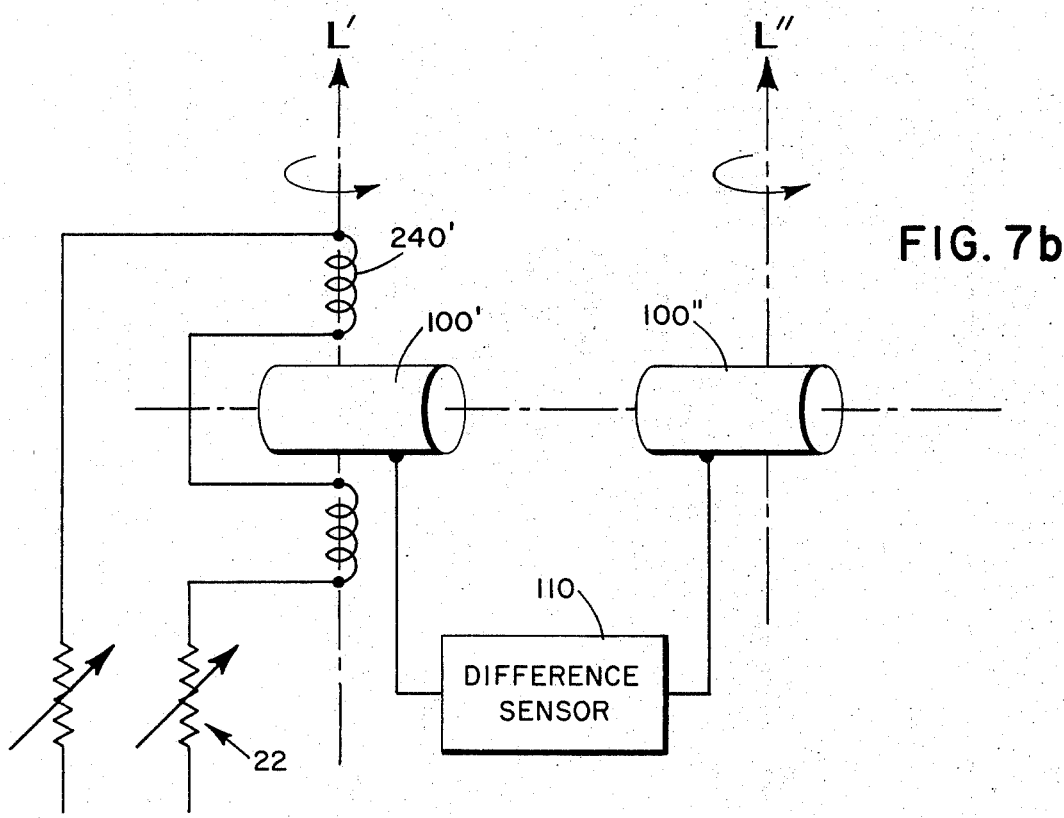

FIG. 7a shows an embodiment in which the magnetometer consists of two field sensors 10' and 10" placed at such a distance that the magnetic field to be measured is effectively the same; the sensors 10' and 10" are exposed to the same gyromagnetic effect. A device 11 supplies a signal proportional to the difference between the signals supplied by sensors 10' and 10" said signal being a corrective signal for the local disturbances due to the apparatus. Each of the sensors 10' and 10" is associated with a winding for creating a corrective magnetic field (24' and 24", respectively) having parallel axes L' and L" which are parallel to the yaw axis of the craft. Windings 24' and 24" are energized in parallel from the output of the amplification stage 20 of the apparatus shown in FIG. 3, across the variable resistances 22 identical with those which are shown in FIG. 3. FIG. 7, represents another embodiment of the invention in which the magnetometer includes a measuring sensor 100' and a second sensor 100" placed at such a distance from the first sensor that the external fields to which the sensors are exposed are effectively the same and oriented so as to be exposed to the same gyromagnetic effect; the device means 110 generate, based on the difference between the magnetic field detected by the two sensors 100' and 100", a corrective signal for the local disturbances due to the apparatus; the means 110 have then the same characteristics and the same functions as the device 11 in FIG. 7a; only the sensor 100' is provided with a winding 240' to create a corrective field, whose axis is parallel to the yaw axis L'; this winding 240' is energized, like the winding 24 shown in FIG. 3, through the variable resistances 22.

An installation of this kind does not react to the gyromagnetic effect itself. Two arrangements are accordingly possible in order to carry this invention into practice:

In accordance with a first mode of application, a correcting coil is associated with each of the two sensors, with the result that the operation of the device which provides automatic compensation for parasites caused by the aircraft is not substantially modified (at least insofar as the lines of force of the applied field have the same orientation at the location of the two sensors).

In accordance with a second mode of application, the measuring sensor alone is subjected to the action of the coil which produces the corrective field $\vec{h}$. Under these conditions, the field $\vec{h}$ of the coil will give rise to an input signal within the automatic compensation installation. In that case, the applied field $\vec{h}$ must not be a field which compensates directly for the action of the gyromagnetic effect but a field which, after having been subjected to the transfer function of the automatic compensation installation, will produce the necessary correction. Adjustment will then be made by trial and error. In other words, in this second embodiment, the automatic compensation installation is constrained to react to the gyromagnetic effect to which it is normally insensitive.

Finally, it is possible to make the corrections by electronic means and the signals delivered by the heading-control system can then be processed by an on-board computer, taking into account a measurement of the dip or of the value of the latitude.

If it is considered sufficient to provide for valid compensation about a given latitude and therefore a given dip, the signal delivered by the heading-control system, as attenuated proportionally to cos $\beta$, or sin $\alpha$, will be superimposed on the magnetic field measurement signal.

It is readily apparent that the invention is not limited to the embodiments which have been described by way of example with reference to the accompanying drawings but extends to all alternative forms which remain within the definition of equivalent means.

What we claimed is:

1. A method of compensating for the gyromagnetic effect sustained by a craft carried total-field magnetometer including a detection winding, and arising from the angular movements performed about one direction by siad craft, the method comprising:
producing a signal having intensity proportional to the angular velocity of said craft about said one direction, and
applying to said detection winding said produced signal.

2. A method according to claim 1 wherein said angular movement is the yawing moments of the craft and said one direction the yawing axis, said magnetometer being disposed along the rolling axis of the craft, said produced signal being proportional to the angular velocity in yawing motion, said step of applying further comprising:
generating a corrective magnetic field having an intensity proportional to the intensity of said produced signal, and
combining vectorially said corrective magnetic field with the magnetic field to be measured.

3. A method according to claim 2, wherein the magnetometer and said detection winding are disposed in parallel relation to the rolling axis of the craft.

4. A device providing compensation for the gyromagnetic effect sustained by a craft-carried total-field magnetometer having a sensing winding, and arising from the angular movements performed about one direction by the craft comprising:
means for producing an electrical signal which is proportional in intensity to the angular velocity of said craft about said one direction; and
coil means connected to said means and responsive to said signal for generating a corrective magnetic field in said sensing winding oriented in said one direction and substantially proportional to said angular velocity.

5. A device according to claim 4, wherein the magnetometer is of the nuclear magnetic resonance type without forbidden axis and the sensing winding of said magnetometer is disposed parallel to the rolling axis of the carrier craft.

6. A device according to claim 4 wherein said coil means has an axis which is parallel to said one direction.

7. A device according to claim 4 whereiin said means for producing the electrical signal is of the type having heading control means responsive to the heading of said craft for supplying three alternating-current voltages, position-indicating means responsive to said alternating current voltages and circuit means wherein said circuit means comprises:
rectifier means responsive to said three alternating-current voltages for supplying two output direct current voltages whose difference is representative of the heading of the craft;
a differentiating circuit connected to the output of said rectifier means for supplying time-dependent derivatives of said two output voltages; and
two symmetrical amplifiers connected to the output of said differentiating circuit said electrical signal being derived from the output of said amplifiers.

* * * * *